United States Patent [19]

Sparks

[11] Patent Number: 4,658,422
[45] Date of Patent: Apr. 14, 1987

[54] BUILDING ENTRANCE TELEPHONE TERMINAL BOX

[76] Inventor: Gary D. Sparks, 4232 Mulligan Dr., Carson City, Nev. 89701

[21] Appl. No.: 767,353

[22] Filed: Aug. 19, 1985

[51] Int. Cl.⁴ .............................................. H04M 9/00
[52] U.S. Cl. ..................................... 379/442; 379/441; 220/3.8; 220/22; 339/44 M
[58] Field of Search ................ 179/179, 178, 175.1 R, 179/81 R; 361/331, 390, 395, 399, 356, 357, 363, 364; D10/46; D13/40; 220/3.8, 20, 22, 242; 339/44 R, 44 M

[56] References Cited

U.S. PATENT DOCUMENTS

| | | | |
|---|---|---|---|
| 4,412,616 | 11/1983 | Williams | 206/333 |
| 4,488,008 | 12/1984 | Dellinger et al. | 179/81 R |
| 4,560,839 | 12/1985 | Dillard | 179/81 C |
| 4,575,169 | 3/1986 | Duplatre et al. | 339/44 M |

FOREIGN PATENT DOCUMENTS

| | | | |
|---|---|---|---|
| 1085046 | 1/1955 | France | 220/20 |
| 2017646 | 10/1979 | United Kingdom | 220/22 |

Primary Examiner—Gene Z. Rubinson
Assistant Examiner—R. Vaas
Attorney, Agent, or Firm—Keith D. Beecher

[57] ABSTRACT

A telephone terminal box which is divided into two compartments so to provide a first compartment accessible only to the telephone operating company and a second compartment accessible to the subscriber. Each compartment has its own cover, and the covers may be individually locked by the subscriber and by the telephone company. The box is constructed so that if it becomes necessary, the telephone company can gain access to the subscriber compartment, however, the subscriber cannot gain access to the telephone company compartment. A terminal block is mounted in the subscriber compartment to provide connections to a predetermined number of subscriber telephones. A protector block is mounted in the telephone company compartment, the terminal block being wired at the factory to one side of the protector block. Another set of wires connects contacts from the protector block to an appropriate module mounted within the telephone company compartment, and which is spliced to permit the leads of a telephone cable to be connected to the protector block. Gaskets are provided around the internal peripheral surfaces of the covers to form a water-tight seal when the covers are closed so that the box may be mounted externally of a building, if so desired.

9 Claims, 8 Drawing Figures

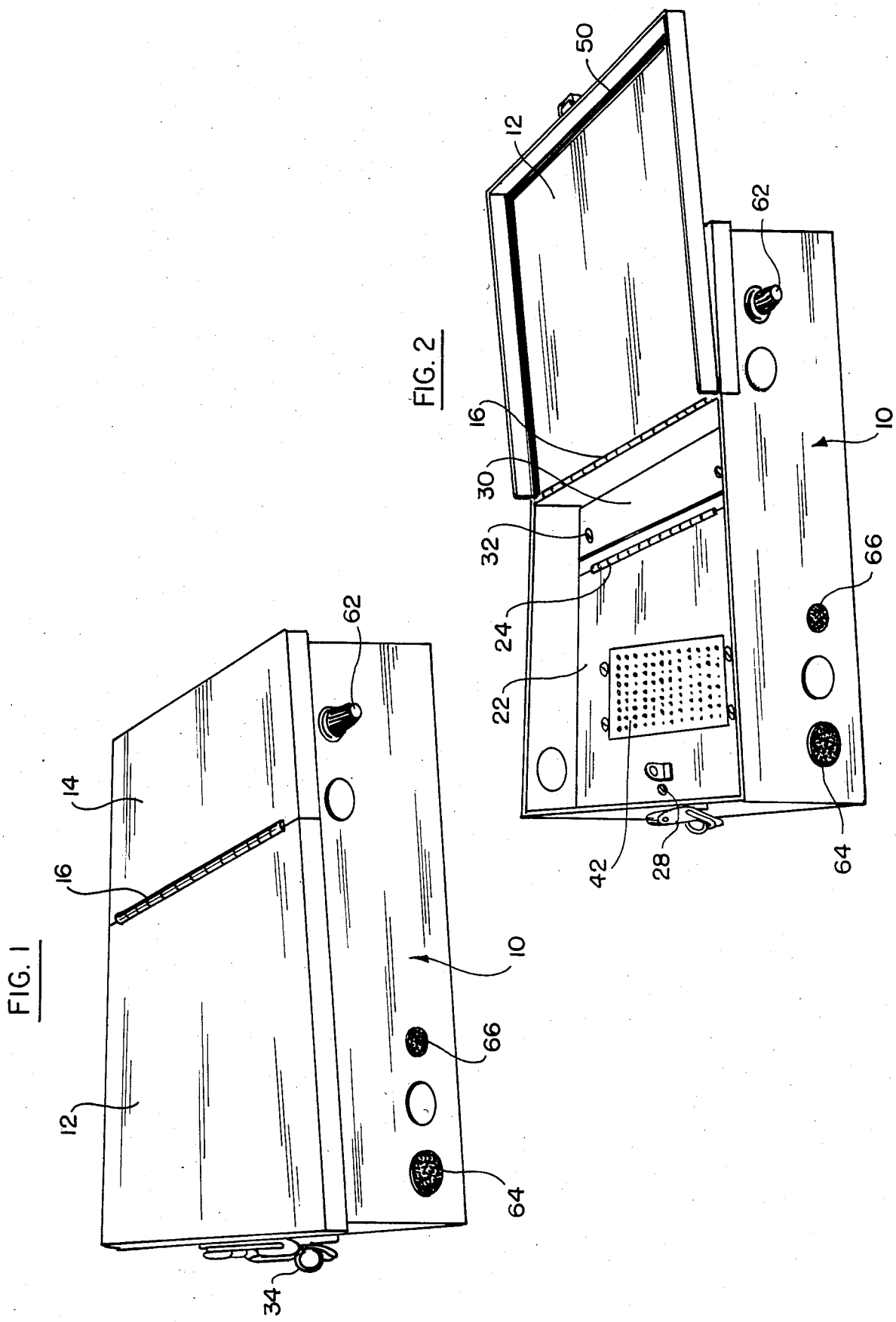

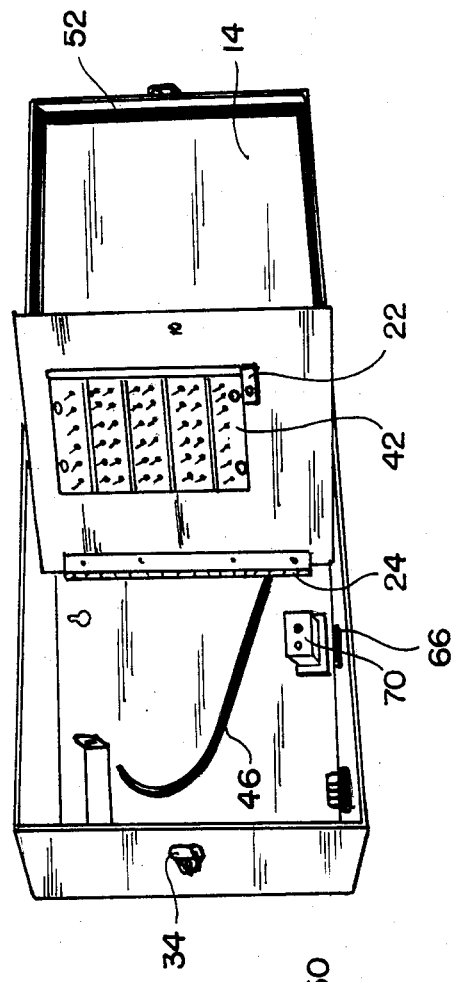
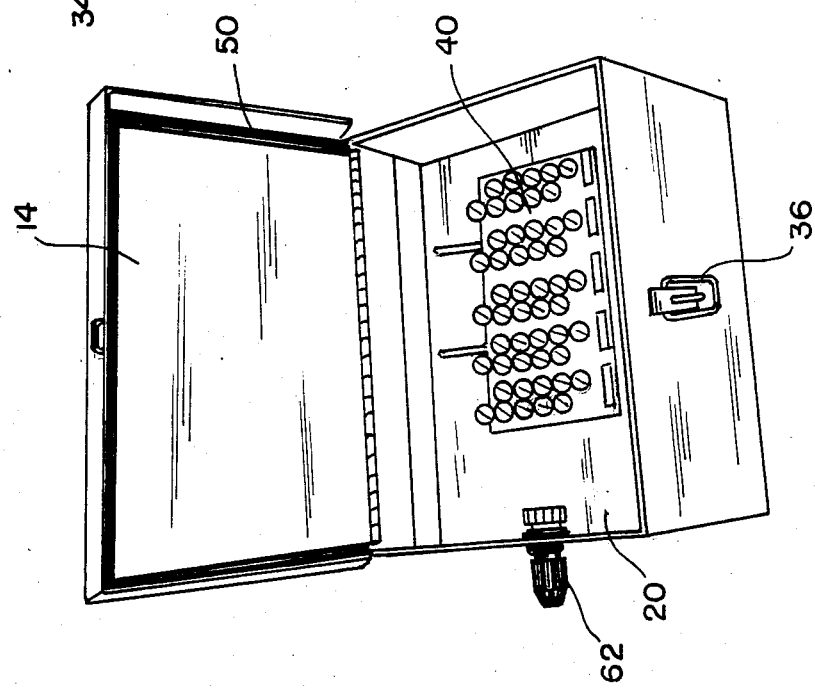

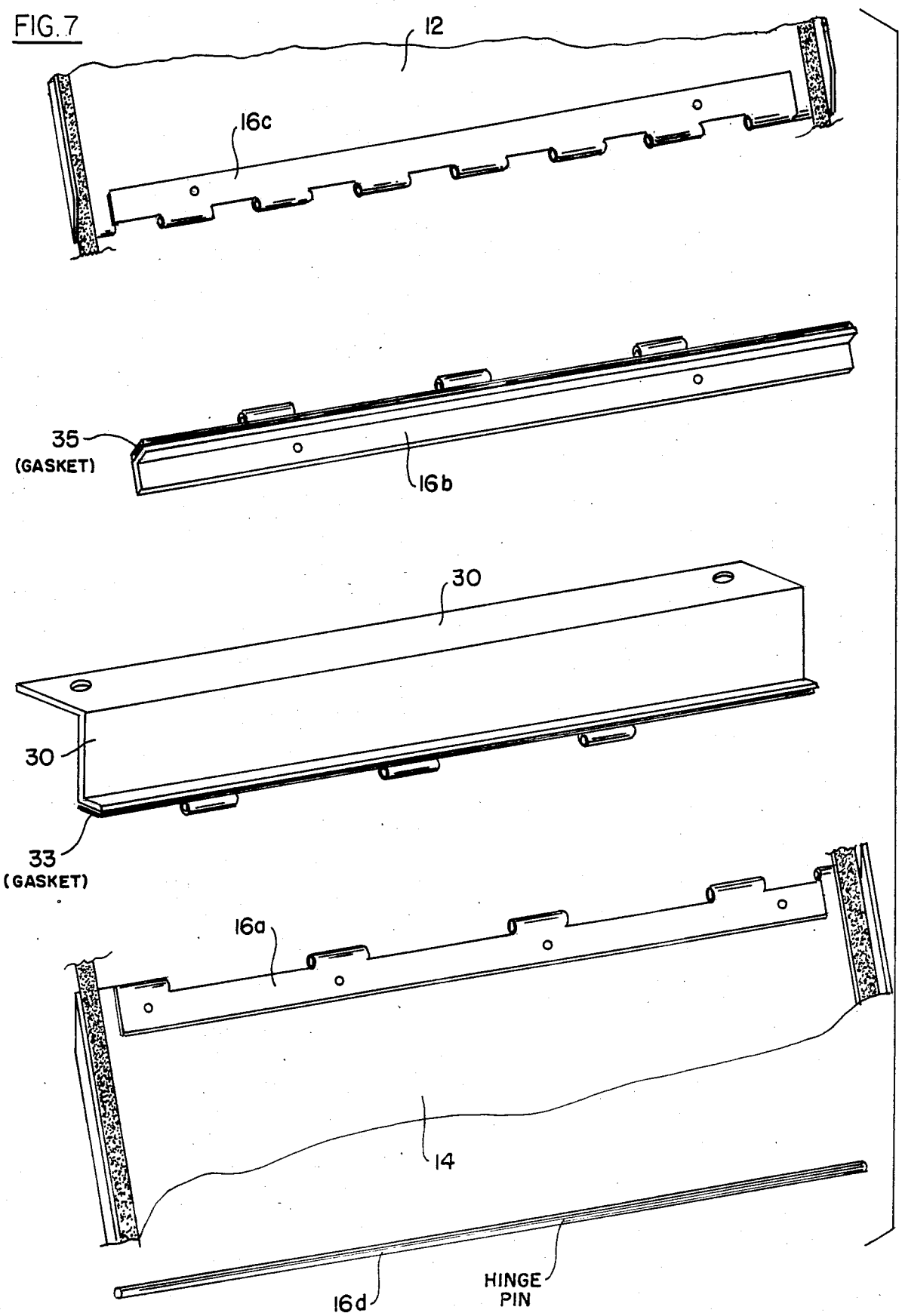

BUILDING ENTRANCE TELEPHONE TERMINAL BOX

BACKGROUND OF THE INVENTION

Recently it has become possible for telephone subscribers to own their own telephones, and to connect them to the telephone lines of the operating telephone company. This has created problems in interfacing subscriber equipment with telephone company equipment. The present invention seeks to solve these problems by the provision of a terminal box which is accessible at one end to the subscriber to permit subscriber telephones to be connected to the telephone company equipment, and which is accessible at the other end only to the telephone company to permit trouble-shooting by the telephone company and, at the same time, to prevent access to equipment of the telephone company by the subscriber. Although the subscriber's end of the terminal box is normally accessible only to the subscriber, the telephone company may gain access to the subscriber's end of the box when necessary, even though the subscriber's end of the box is locked by the subscriber.

The terminal boxes may be provided in a variety of sizes. They are stackable one on top of the other when expansion is needed. Each of the boxes is provided with a removable chassis, or shelf, so that each box may be adapted to handle different numbers of telephones.

Each box may be provided with a test unit at the subscriber's end so that each subscriber can check out their telephones.

BRIEF DESCRIPTION OF THE DRAWINGS

FIG. 1 is a perspective view of a telephone terminal box constructed in accordance with one embodiment of the invention, and which includes two covers on the top of the box which are hinged together by a common 3-way hinge;

FIG. 2 is a view of the terminal box like FIG. 1, with one of the covers open to reveal the end of the box accessible only to the telephone company;

FIG. 3 is a view of the terminal box with the other cover open to reveal the end of the box accessible to the subscriber;

FIG. 4 is a view of the underside of a hinged chassis in compartment accessible only to the telephone company, with the chassis turned up to reveal the the compartment underlying the chassis;

FIG. 7 is a detailed view of the 3-way hinge of FIG. 5; and

DETAILED DESCRIPTION OF THE ILLUSTRATED EMBODIMENT

Figure 6:
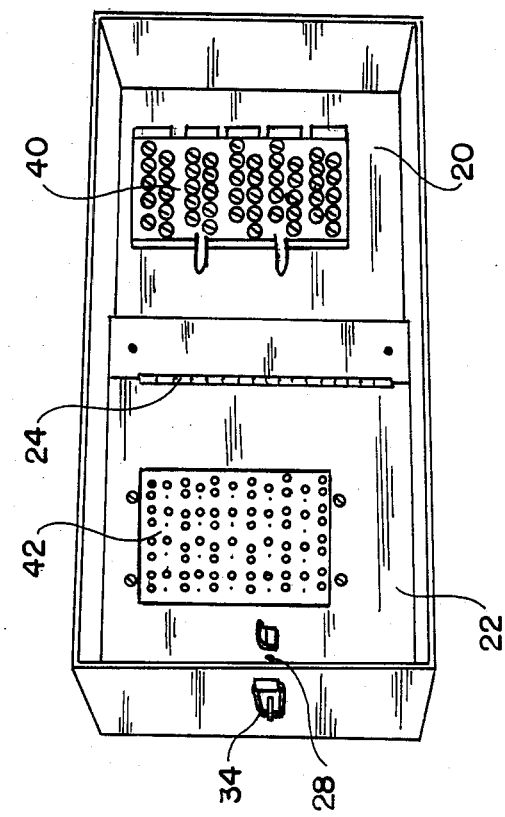
FIG. 6 is a view of the terminal box of FIG. 1 with the covers and bracket of FIG. 5 removed.
Figure 5:
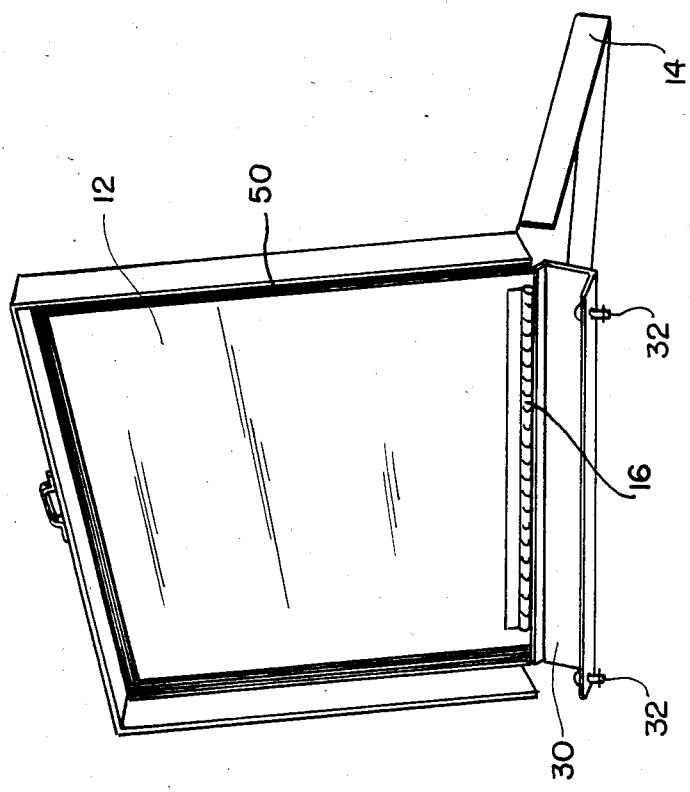
FIG. 5 is a view of the two covers of the terminal box of FIG. 1, a 3-way hinge, and a mounting bracket, with the covers removed from the box.

The telephone terminal box of the invention is designated generally as 10 in FIGS. 1-3. The terminal box includes a first cover 12 and a second cover 14 which are hinged together by a common 3-way hinge 16. A first chassis 20 is mounted in one compartment of the terminal box, as best shown in FIG. 6, and a second chassis 22 is mounted in another compartment of the box, the chassis 20 being hinged to the chassis 22 by a hinge 24. Chassis 22 may be turned up to gain access to the interior of the compartment underlying the chassis, as shown in FIG. 4. Chassis 22 is held in its down position by a screw 28. The hinge 16 of covers 12 and 14 is attached to an elongated bracket 30 (see also FIG. 7). The bracket 30 is mounted on the chassis by screws 32, and extends across the box from one side to the other to divide the box into the two compartments.

As shown in FIG. 7, the three-way hinge assembly comprises a first strip 16a which is attached to cover 14, bracket 30, an angled strip 16b which is attached to bracket 30, and a flat strip 16c which is attached to cover 12. Strips 16a, 16b and 16c are all pivotally attached to a hinge pin 16d to form hinge 16. A gasket 33 is attached to bracket 30, and a gasket 35 is attached to strip 16b to seal the hinge.

The chassis 22 is mounted in the telephone company's compartment of the box and is accessible when cover 12 is opened, as shown in FIG. 2. Chassis 20, on the other hand, is mounted in the subscriber's compartment of the box, and it is accessible when cover 14 is opened, as shown in FIG. 3. The screws 32 are accessible in the telephone company's compartment when cover 12 is opened, and this enables the telephone company to remove both covers 12 and 14 and gain access to the subscriber's compartment of the box, should the need arise, even though the cover 14 is locked over the subscriber's compartment by the subscriber. However, the subscriber cannot gain access to the telephone company's compartment of the box.

Cover 12 may be closed and locked by a latch 34 (FIG. 1), to close the telephone company's compartment; and cover 14 may be closed and locked by a latch 36 (FIG. 3) to cover the subscriber's compartment. However, as mentioned above, once access has been gained to the telephone company's compartment, screws 32 may be removed, so that both covers may be removed from the box to permit access by the telephone company to the subscriber's compartment, even though the subscriber has locked the cover 14.

Figure 8:
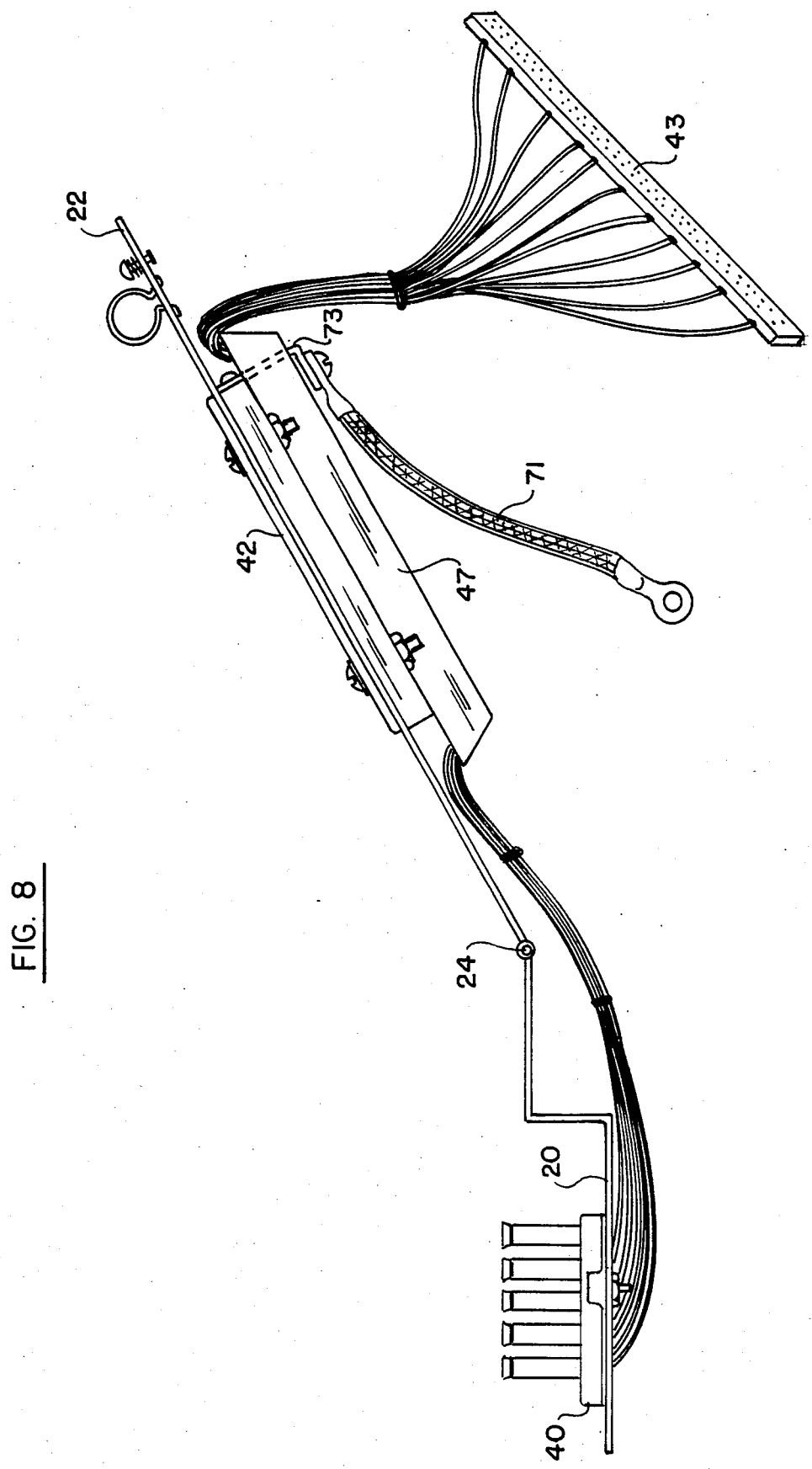
FIG. 8 is a view of the internal chassis and wiring of the terminal box.

The terminal block 40 is mounted on chassis 20 in the subscriber's compartment of the box, and this terminal block is used for connecting the subscriber's telephones to the telephone lines. The leads from the telephones are received through openings in the side of the box in the subscriber's compartment, and are connected in pairs to the terminal block 40. The illustrated terminal block 40 permits connections to be made to up to twenty-five telephones, however, larger sizes may be constructed to permit connections to up to 200 telephones, or more. A protector block 42 is mounted on chassis 22 in the telephone company's compartment. The terminal block 40 is factory wired to contacts on the underside of protector block 42 through wires 46, shown in FIG. 8. The back of the protector block may be encapsulated as at 47 for moisture protection.

The covers 12 and 14 are provided with rubber-like gaskets 50, 52 (FIGS. 2 and 4) to make the box waterproof when the covers are closed. The holes into the telephone company's compartment of the box which receives the telephone cables are provided with waterproof washers 64, 66. Access for the telephone wires to the subscriber's compartment of the box is provided through a waterproof bushing 62 mounted on the side of the box.

The telephone cables are inserted into the telephone company's compartment underlying chassis 22 through the bushing 64, and are spliced to a connector 43 attached to the underside of the protector block 42. Splicing of the telephone cables is achieved through a modular splicing frame (not shown) which is mounted in the telephone company's compartment of the box. A ground connecting wire is inserted through waterproof bushing 66 and is directly received in a terminal post 70 (FIG. 4) without any need to bend the wire. A ground wire 71 is connected to a ground block 73 of protector block and connects the ground block to the terminal post 70.

As explained above, the elongated bracket 30, as shown in FIG. 2, divides the box 10 into two compartments, with covers 12 and 14 being hinged to the bracket so that the covers may be individually opened and closed to gain access to the telephone company's compartment and to the subscriber's compartment. As also described, the box is designed so that the telephone operating company and the subscriber can use individual locks to lock the box completely. However, if for any reason the telephone company needs to get into the subscriber compartment, this can easily be achieved by removing screws 32, and then by moving the hinge and covers completely out of the box, even though the subscriber's cover is locked. The telephone company may then complete any work that may be necessary in the subscriber's compartment, and replace the subscriber's cover completely without any evidence that it had ever been opened.

Moreover, should the telephone company need to get to the underside of the telephone company's compartment, this may be achieved by loosening screw 28, and by turning up chassis 22 about hinge 24 to the position shown in FIG. 4, after loosening screw 28.

Mounting holes are provided on the back of the box, and these mounting holes are embossed outwardly to form standoffs so that the box does not sit completely flat into the wall on which it is mounted. This allows any moisture or rain to run down behind the box. The mounting holes are sealed off by the use of rubber faced washers.

The box has a rolled edge which extends around its perimeter to keep moisture from penetrating the box and also to roll under the covers to make them fit securely, and additionally to add strength to the box and provide a wide area to seal against the rubber gaskets 50, 52.

The screws 28 and 32 may be one-quarter turn spring-loaded screws with safety catches, so that the various components may be released merely by turning the corresponding screws slightly.

It will be appreciated that while a particular embodiment of the invention has been shown and described, modifications may be made. It is intended in the claims to cover all modifications which come within the true spirit and scope of the invention.

I claim:

1. A telephone terminal box comprising: at least one chassis mounted in said box; first and second covers; an elongated bracket; a common hinge attached to the first and second covers and to the bracket; and fastener means removably mounting the bracket on the chassis with the bracket extending across the chassis from one side of the box to the other to divide the box into first and second compartments, said first cover providing access to said first compartment and said second cover providing access to said second compartment, said fastening means being located in said first compartment to permit the covers and bracket to be removed when access is gained to said first compartment.

2. The telephone terminal box defined in claim 1, in which said box has a rectangular configuration.

3. The telephone terminal box defined in claim 1, and which includes first and second latches respectively attached to the first and second covers to permit the first and second compartments to be individually locked.

4. The telephone terminal box defined in claim 1, and which includes a protector block mounted on said chassis and located in said first compartment, and a terminal block mounted on said chassis and located in said second compartment to be wired to said protector block.

5. The telephone terminal box defined in claim 4, in which said chassis comprises first and second portions hinged to one another, with the first portion of the chassis being located in said first compartment, and the second portion of the chassis being located in said second compartment, so that said first portion of the chassis may be turned up to reveal the underside of the protector block.

6. The telephone terminal box defined in claim 5, in which the box has at least one hole on a side thereof to enable a telephone cable to be inserted into the first compartment under the first portion of the chassis to be spliced to contacts on the underside of the protector block.

7. The telephone terminal box defined in claim 6, and which includes a rubber-faced washer mounted in the hole to prevent moisture from entering the interior of the box.

8. The telephone terminal box defined in claim 1, and which includes a rubber gasket mounted around the inner peripheral surface of each of the covers to prevent moisture from entering the interior of the box, when the covers are closed.

9. The telephone terminal box defined in claim 5, and which includes a hole in one side of the box to enable a ground wire to be inserted into the first compartment under the first portion of the chassis; and a terminal post mounted in said first compartment in alignment with the hole for receiving the ground wire.

* * * * *